US012664482B2

(12) United States Patent
Wang et al.

(10) Patent No.: US 12,664,482 B2
(45) Date of Patent: Jun. 23, 2026

(54) FEDERATED ENSEMBLE LEARNING FROM DECENTRALIZED DATA WITH INCREMENTAL AND DECREMENTAL UPDATES

(71) Applicant: INTERNATIONAL BUSINESS MACHINES CORPORATION, Armonk, NY (US)

(72) Inventors: Shiqiang Wang, White Plains, NY (US); Supriyo Chakraborty, White Plains, NY (US); Nirmit V. Desai, Yorktown Heights, NY (US); Douglas M. Freimuth, New York, NY (US); Wei-Han Lee, White Plains, NY (US); Changchang Liu, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 1583 days.

(21) Appl. No.: 17/073,341

(22) Filed: Oct. 17, 2020

(65) Prior Publication Data

US 2022/0121999 A1     Apr. 21, 2022

(51) Int. Cl.
  *G06N 20/20* (2019.01)
  *G06N 5/04* (2023.01)
(52) U.S. Cl.
  CPC ............... *G06N 20/20* (2019.01); *G06N 5/04* (2013.01)
(58) Field of Classification Search
  CPC .......... G06N 20/00; G06N 5/04; G06N 20/20
  See application file for complete search history.

(56) References Cited

U.S. PATENT DOCUMENTS

| | | | |
|---|---|---|---|
| 10,223,762 B2 | 3/2019 | Ashari et al. | |
| 10,650,928 B1 | 5/2020 | Larson et al. | |
| (Continued) | | | |

FOREIGN PATENT DOCUMENTS

| | | |
|---|---|---|
| CN | 110119271 A | 8/2019 |
| CN | 107169575 A | 9/2019 |
| WO | 2020036847 A1 | 2/2020 |

OTHER PUBLICATIONS

Authors: Nishio & Yonetani Title: Client Selection for Federated Learning with Heterogeneous Resources in Mobile Edge Date: Jul. 15, 2019 (Year: 2019).*

(Continued)

*Primary Examiner* — David Yi
*Assistant Examiner* — Amy Tran
(74) *Attorney, Agent, or Firm* — CHIP LAW GROUP

(57) ABSTRACT
A computer implemented method includes distributing a plurality of prediction models, where each of a plurality of clients initially includes at least one associated prediction model from the plurality of prediction models, among all of the plurality of clients to provide each of the plurality of clients with each of the plurality of prediction models. The plurality of prediction models is evaluated on at least a portion of a local dataset resident on each of the plurality of clients to output a quantification indicating how each of the prediction models fit at least the portion of the local dataset of each of the plurality of clients. An ensemble model is generated by applying weights to each of the plurality of prediction models based on a value, a gradient, and a Hessian matrix of a user-defined objective.

18 Claims, 9 Drawing Sheets

(56) References Cited

U.S. PATENT DOCUMENTS

| | | | |
|---|---|---|---|
| 10,656,631 B2 | 5/2020 | Lee et al. | |
| 2018/0025287 A1* | 1/2018 | Mathew | G06N 5/04 |
| | | | 706/12 |
| 2019/0018821 A1 | 1/2019 | Ormont et al. | |
| 2019/0108417 A1 | 4/2019 | Talagala et al. | |
| 2019/0220758 A1 | 7/2019 | Talyansky et al. | |
| 2019/0318237 A1* | 10/2019 | Tashev | G06F 3/165 |
| 2020/0210812 A1 | 7/2020 | Baker | |

OTHER PUBLICATIONS

Authors: Kokkinos et al. Title: Confidence ratio affinity propagation in ensemble selection of neural network classifiers for distributed privacy-preserving data mining Date: Jul. 21, 2014 (Year: 2014).*

Authors: Fang et al. Title: Local Model Poisoning Attacks to Byzantine-Robust Federated Learning Date: Aug. 12-14, 2020 (Year: 2020).*

Authors: Zhu et al, Title: ConvsPPIS: Identifying Protein-protein Interaction Sites by an Ensemble Convolutional Neural Network with Feature Graph Date: Oct. 24, 2019 (Year: 2019).*

Authors: Salimi et al. Title: Extended Mixture of MLP Experts by Hybrid of Conjugate Gradient Method and Modified Cuckoo Search Date: Jan. 2012 (Year: 2012).*

Authors: Bhagoji et al. Title: Analyzing Federated Learning through an Adversarial Lens Date: Nov. 29, 2018 (Year: 2018).*

Authors: Soares & Chen Title: A Cluster-Based Semi-supervised Ensemble for Multiclass Classification Date: Dec. 2017 (Year: 2017).*

Authors: Li et al. Title: Learning to Detect Malicious Clients for Robust Federated Learning Date: Feb. 1, 2020 (Year: 2020).*

Authors: Guha et al. Title: One-Shot Federated Learning Publication Date: Mar. 5, 2019 (Year: 2019).*

Whalen, S. et al., "Model Aggregation for Distributed Content Anomaly Detection"; Proceedings of the 2014 Workshop on Artificial Intelligent and Security Workshop, 2014, 20 pages.

Hu, C. et al., "Decentralized Federated Learning: A Segmented Gossip Approach"; arXiv preprint, arXiv:1908.07782v1, Aug. 21, 2019, 7 pages.

* cited by examiner

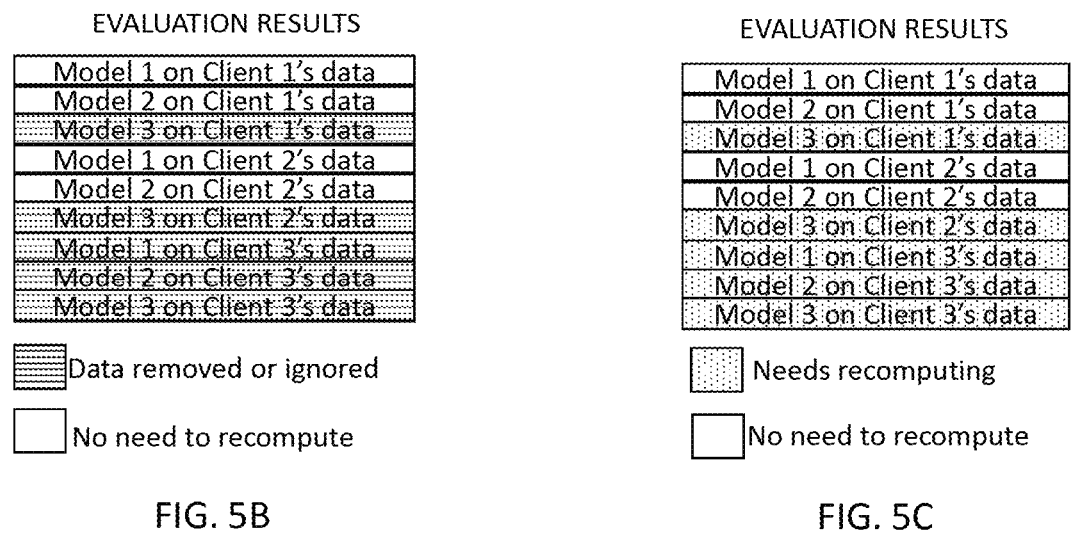

EVALUATION RESULTS

| |
|---|
| Model 1 on Client 1's data |
| Model 2 on Client 1's data |
| Model 3 on Client 1's data |
| Model 1 on Client 2's data |
| Model 2 on Client 2's data |
| Model 3 on Client 2's data |
| Model 1 on Client 3's data |
| Model 2 on Client 3's data |
| Model 3 on Client 3's data |

Data removed or ignored

No need to recompute

FIG. 5B

EVALUATION RESULTS

| |
|---|
| Model 1 on Client 1's data |
| Model 2 on Client 1's data |
| Model 3 on Client 1's data |
| Model 1 on Client 2's data |
| Model 2 on Client 2's data |
| Model 3 on Client 2's data |
| Model 1 on Client 3's data |
| Model 2 on Client 3's data |
| Model 3 on Client 3's data |

Needs recomputing

No need to recompute

FIG. 5C

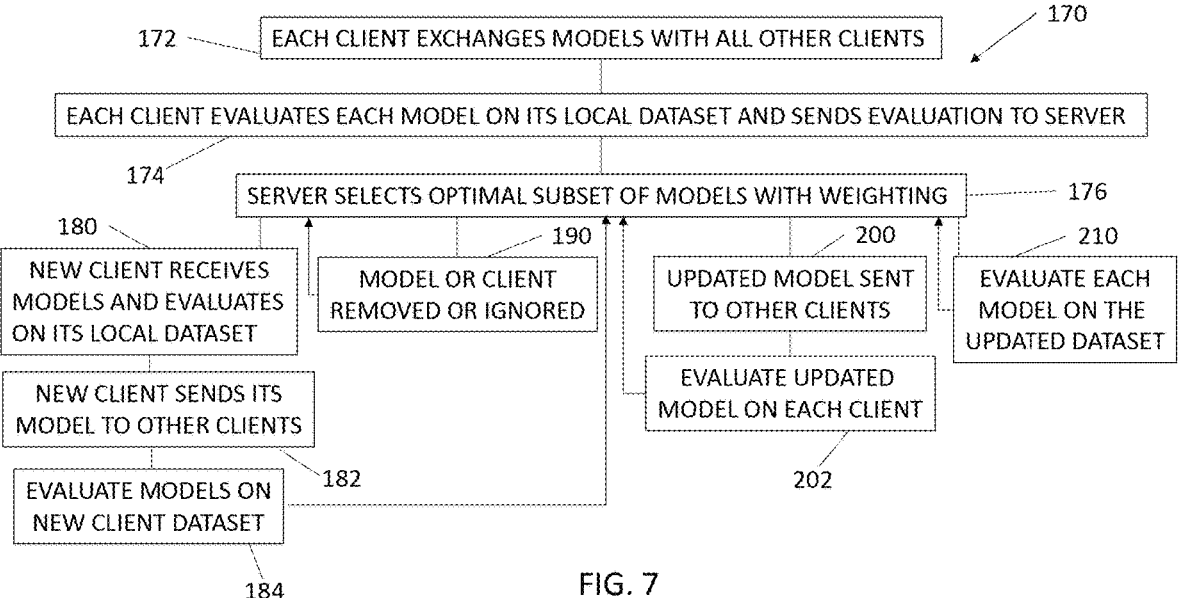

172 ── EACH CLIENT EXCHANGES MODELS WITH ALL OTHER CLIENTS     ⟋ 170

EACH CLIENT EVALUATES EACH MODEL ON ITS LOCAL DATASET AND SENDS EVALUATION TO SERVER

174

SERVER SELECTS OPTIMAL SUBSET OF MODELS WITH WEIGHTING ┄┄┄ 176

180

| NEW CLIENT RECEIVES MODELS AND EVALUATES ON ITS LOCAL DATASET |

190 — MODEL OR CLIENT REMOVED OR IGNORED

200 — UPDATED MODEL SENT TO OTHER CLIENTS

210 — EVALUATE EACH MODEL ON THE UPDATED DATASET

NEW CLIENT SENDS ITS MODEL TO OTHER CLIENTS

EVALUATE UPDATED MODEL ON EACH CLIENT

EVALUATE MODELS ON NEW CLIENT DATASET   182

FEDERATED ENSEMBLE LEARNING FROM DECENTRALIZED DATA WITH INCREMENTAL AND DECREMENTAL UPDATES

STATEMENT REGARDING FEDERALLY SPONSORED RESEARCH OR DEVELOPMENT

This application has been written with Government support under Contract No. W911NF-16-3-0001 awarded by Army Research Office (ARO). The Government has certain rights in this application.

BACKGROUND

Technical Field

The present disclosure generally relates to ensemble learning systems, and more particularly, to methods and systems for federated ensemble learning from decentralized data.

Description of the Related Art

Many real-world applications involve the training of models from decentralized datasets without sharing the data. These datasets can be held by multiple clients. One model training approach is federated learning based on decentralized gradient descent. This involves multiple rounds of information among participating clients. When clients are connected intermittently or different clients use different model architectures, the decentralized gradient descent approach typically does not work. Another approach is ensemble learning where the outputs of each client's model are combined directly to produce the final result.

There are several considerations when applying exiting ensemble learning techniques to the federated setting. Since training data is decentralized in clients, it is difficult to determine an optimal way of combining different models' outputs in the ensemble model. Further, it is inefficient to use models from all clients in the ensemble. This raises the question as to what is the best subset of models to select. Finally, there is no way to efficiently update the ensemble when some models and/or clients would like to be added or removed from an existing ensemble model.

SUMMARY

According to various embodiments, a computing device, a non-transitory computer readable storage medium, and a method are provided for using decentralized data with incremental and decremental updates for federated ensemble learning.

In one embodiment, a computer implemented method includes distributing a plurality of prediction models, where each of a plurality of clients initially includes at least one associated prediction model from the plurality of prediction models, among all of the plurality of clients to provide each of the plurality of clients with each of the plurality of prediction models. Each of the plurality of prediction models is evaluated on at least a portion of a dataset resident on each of the plurality of clients to output a quantification indicating how each of the prediction models fit at least the portion of the local dataset of each of the plurality of clients. An ensemble model is generated by applying weights to each of the plurality of prediction models based on a value, a gradient, and a Hessian matrix of a user-defined objective.

In some embodiments, the ensemble model is generated in a decentralized manner without including an exchange of raw data among the plurality of clients.

In some embodiments, the vector is independent of a size of each of the datasets resident on each of the plurality of clients.

In some embodiments, the vector includes a value, a gradient, and a Hessian matrix of a user-defined objective.

In some embodiments, the method further includes limiting a number of models from the plurality of models that are assigned a weight greater than zero to a predetermined threshold.

In some embodiments, the method further includes adding an additional client to the plurality of clients and distributing each of the prediction models of the plurality of prediction models to the additional client. The one or more additional models associated with the additional client are distributed to the plurality of clients. The additional model can be evaluated on datasets resident on each of the plurality of clients. Each of the plurality of models, including the one or more additional models, can be evaluated on the additional client.

In some embodiments, the method further includes removing or ignoring the associated prediction model of a removed client from each of the plurality of clients.

In some embodiments, the method further includes upon determining that a model has changed on one of the plurality of clients, re-valuating the changed model on each of the plurality of clients on at least the portion of the dataset resident on each of the plurality of clients.

In some embodiments, the method further includes, upon determining that at least the portion of the dataset of a changed client of the plurality of clients is changed, re-evaluating each of the plurality of models on at least the portion of the dataset of the changed client.

In some embodiments, the method further includes optimizing the weights applied to each of the plurality of models to minimize error between a predicted label given by the ensemble model and a ground truth label.

In some embodiments, the method further includes receiving, by a central server, each vector for each of the plurality of clients.

According to various embodiments, a computerized federated ensemble learning system includes a plurality of clients in communication with a server. One or more prediction models and a dataset are resident at each of the plurality of clients. Each of the one or more prediction models are distributed to each of the plurality of clients. Each of the plurality of clients is configured to evaluate each of the plurality of prediction models on at least a portion of the dataset resident on each of the plurality of clients and output a quantification indicating how each of the prediction models fit at least the portion of the local dataset of each of the plurality of clients. The server is configured to generate an ensemble model by applying weights to each of the plurality of models.

According to various embodiments, a non-transitory computer readable storage medium tangibly embodies a computer readable program code having computer readable instructions that, when executed, causes a computer device to carry out a method of improving computing efficiency of a computing device operating a federated learning system. The method includes distributing a plurality of prediction models, where each of a plurality of clients initially includes at least one associated prediction model from the plurality of prediction models, among all of the plurality of clients to provide each of the plurality of clients with each of the plurality of prediction models. The method further includes evaluating each of the plurality of prediction models on at least a portion of a dataset resident on each of the plurality of clients to output a quantification indicating how each of the prediction models fit at least the portion of the local dataset of each of the plurality of clients. The method further includes generating an ensemble model by applying weights to each of the plurality of prediction models based on a value, a gradient, and a Hessian matrix of a user-defined objective.

By virtue of the concepts discussed herein, a system and method are provided that improves upon the approaches currently used in ensemble learning. These concepts can assure scalability and efficiency of such ensemble learning systems while minimizing the amount of data required to be shared between clients with their own decentralized datasets and/or between such clients and a server.

These and other features will become apparent from the following detailed description of illustrative embodiments thereof, which is to be read in connection with the accompanying drawings.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all the components or steps that are illustrated. When the same numeral appears in different drawings, it refers to the same or like components or steps.

FIG. 5B illustrates data operation upon a client leaving the system model of FIG. 1 and that client's model being removed.

FIG. 5C illustrates data operation when a client changes its model and its data.

FIG. 7 illustrates a flow chart describing a method for federated ensemble learning, consistent with an illustrative embodiment.

DETAILED DESCRIPTION

In the following detailed description, numerous specific details are set forth by way of examples to provide a thorough understanding of the relevant teachings. However, it should be apparent that the present teachings may be practiced without such details. In other instances, well-known methods, procedures, components, and/or circuitry have been described at a relatively high-level, without detail, to avoid unnecessarily obscuring aspects of the present teachings.

Unless specifically stated otherwise, and as may be apparent from the following description and claims, it should be appreciated that throughout the specification descriptions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

As discussed in greater detail below, the present disclosure generally relates to systems and computerized methods for training models from decentralized datasets without sharing the data and minimizing the amount of information that is to be exchanged. The systems and computerized methods provide a technical improvement in the efficiency, scalability and privacy of data in model training computer systems by using only the models to be shared between clients and by permitting the incremental/decremental updates of the ensemble model without the need to re-evaluate all the models.

Reference now is made in detail to the details illustrated in the accompanying drawings and discussed below.

Figure 1:
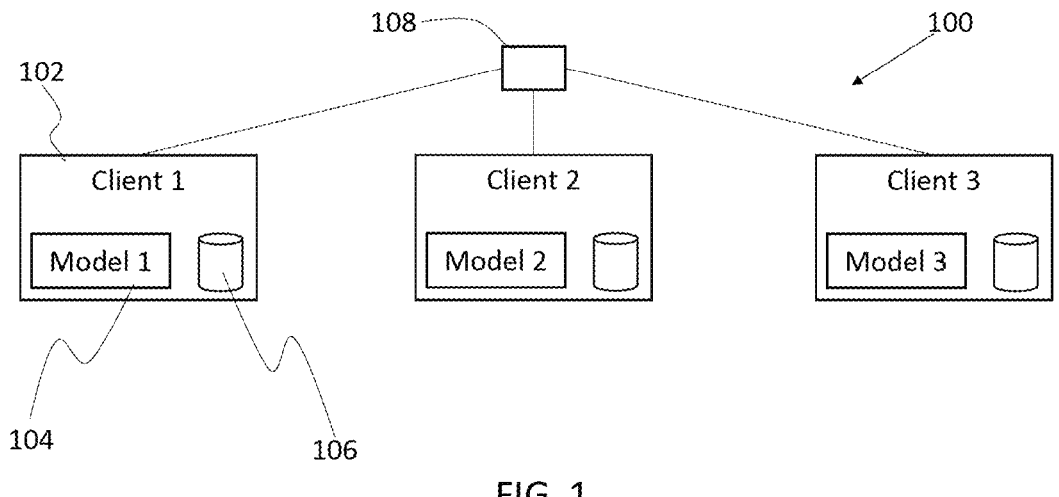
FIG. 1 is a schematic representation of a system model for federated ensemble learning, consistent with an illustrative embodiment.
Figure 2:
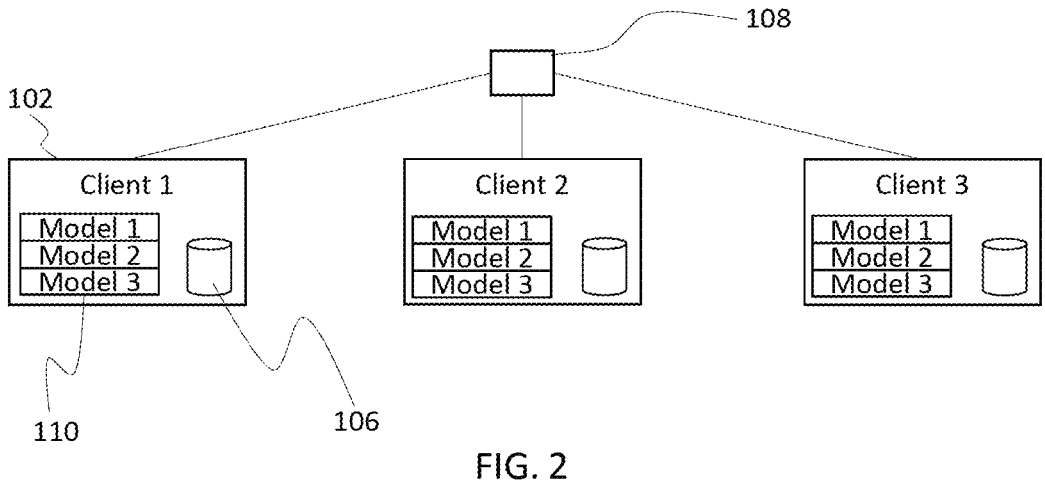
FIG. 2 is a schematic representation of the system model of FIG. 1, illustrating how each client's model is shared with the remaining clients.

Referring to FIGS. 1 and 2, a system 100 for federated ensemble learning, also referred to as ensemble model 100, is illustrated, where each client 102 includes one or more models 104 and a dataset 106. The clients 102 can be interconnected through a server 108. While three clients 102 are illustrated, it should be understood that the number of clients can be any number and may change, as discussed in greater detail below.

Figure 3:
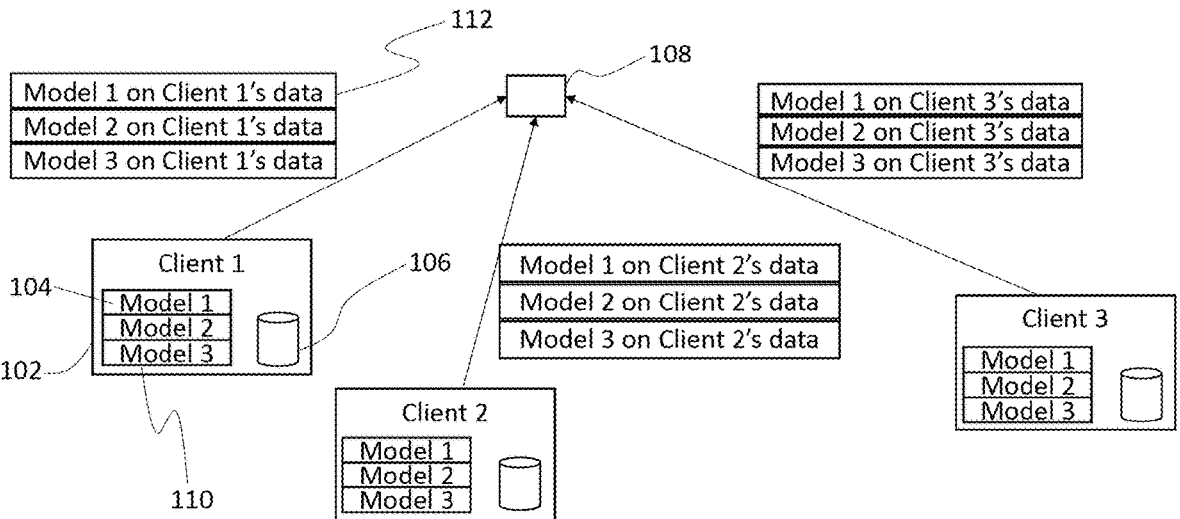
FIG. 3 is a schematic representation of the system model of FIG. 1, illustrating the evaluation results of each model on a specific client's data is sent to a centralized server.

The clients 102 can exchange models with other clients in the system 102 such that each client 102 has a set 110 of models. As illustrated in FIG. 3, each client 102 can evaluate each model 104 in the set 110 on its local dataset 106. It should be understood that the models 104 can be evaluated on all or a portion of the local dataset 106, depending on user parameters.

Evaluation results 112 can be sent to the server 108. The evaluation results 112 can depend on the ensemble objective function, such as minimizing mean square error, and the information that needs to be exchanged between the clients 102 and the server 108 remains fixed and independent of the size of the dataset 106. One example of the evaluation result 112 can be a value, a gradient and a Hessian evaluated on an arbitrary ensemble weight for each of the models 104.

Figure 4:
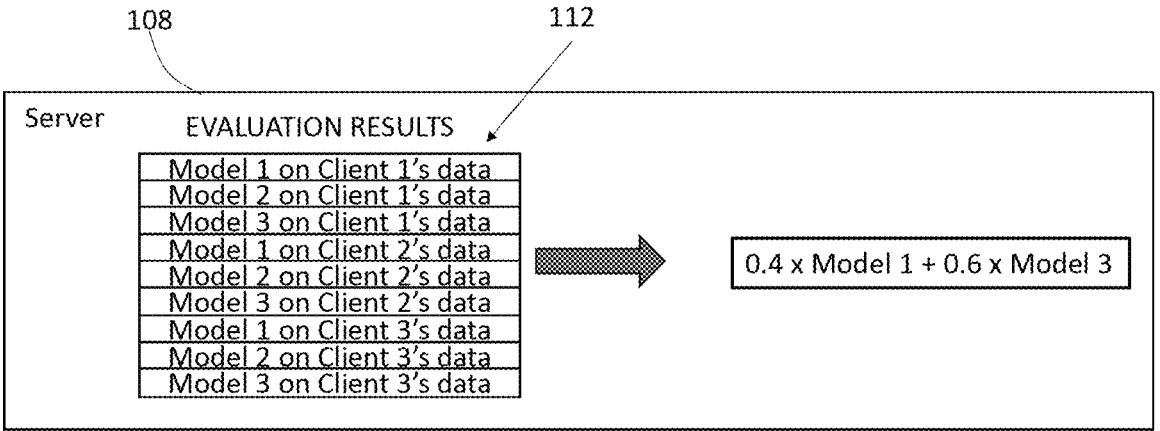
FIG. 4 illustrates server operation on the evaluation results of FIG. 3 to select and provide weights to each model, consistent with an illustrative embodiment.

Referring now to FIGS. 3 and 4, after the server 108 receives the evaluation results 112 for each of the clients 102, the server can determine an optimal subset of models and assign weights for the combination of selected models. For example, as shown in FIG. 4, model 1 may be provided a 0.4 weight, model 3 may be provided a 0.6 weight, and model 2 may not be selected. Details of the determination of these weights are provided below.

Figure 5A:
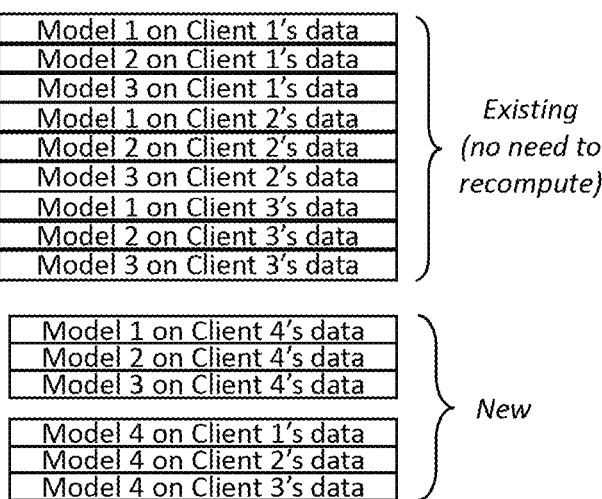
FIG. 5A illustrates data operation upon the addition of a new client and dataset into the system model of FIG. 1.

As discussed above, aspects of the present disclosure provide a federated ensemble model that allows for incremental and/or decremental updates without the need to re-evaluate all of the models. FIGS. 5A through 5C show specific examples of such operations.

FIG. 5A illustrates operations when a new client, such as "client 4" joins the ensemble model. There is no need to recompute the results of models 1, 2 and 3 on clients 1, 2 and 3, as the datasets and models are unchanged. However, model 4 of client 4 can be shared with clients 1, 2 and 3 and the datasets of clients 1, 2 and 3 can be run on model 4. Further, client 4 can receive models 1, 2 and 3 and the dataset of client 4 can be run on models 1, 2 and 3 at client 4.

FIG. 5B illustrates operations when a client leaves the ensemble. In this example, client 3 leaves the ensemble. In this event, there is no need for any re-computations. Instead, model 3 results on the datasets of clients 1 and 2 is removed, as well as models 1, 2 and 3 on the dataset of client 3.

FIG. 5C illustrates operations where a client has changed its model and its dataset. In this example, client 3 has changed its dataset and its model. Thus, updated model 3, at clients 1, 2 and 3, can be recomputed and models 1 and 2 at client 3 can be recomputed on the updated dataset of client 3. It should be understood that, while FIG. 5C illustrates a client changing its model and its dataset, in some embodiments, a client can change one of the model or dataset, where such changes would trigger only partial re-computation at clients 1, 2 and 3, without the need to recompute an entirety of the ensemble model.

Figure 6:
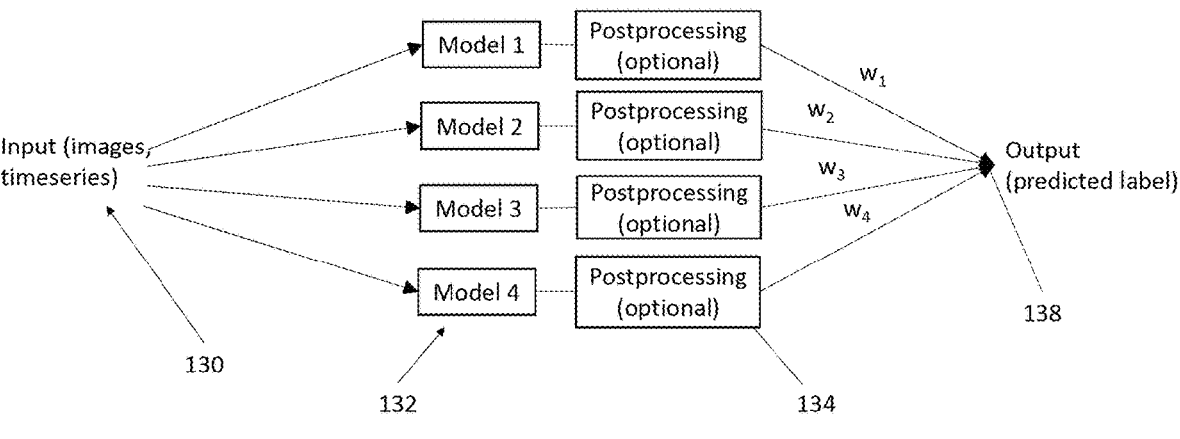
FIG. 6 illustrates an overview of data flow through each model with weighting to provide an output.

Referring now to FIG. 6, a more detailed description of the data processing and optimization of system weights is provided. An input 130, from all or a portion of a client's local dataset 106 (see FIGS. 1 and 2) can be operated on by various models 132, such as model 1, model 2, model 3 and model 4. Optional post-processing 134 and weights, $w_1$, $w_2$, $w_3$ and $w_4$ may be applied, as described below, to provide an output 138 as a vector indicating the probability of each label as predicted by the model.

The post-processing 134 can include, as one example, a "one-hot" quantization, such that in the output vector, the most likely label corresponds to a value of 1 and all other labels correspond to a value of zero. This can provide a majority voting-based ensemble. If there is no post-processing 134, then the voting is done directly by the probabilities of labels. Thus, the ensemble model, according to aspects of the present disclosure, can support both soft labels and hard labels.

If $w_i$ is zero, where i is the model number, then that model is not selected. The ensemble model can determine each $w_i$ such that the ensemble model gives the highest overall accuracy on the collection of decentralized datasets at each client and such that the number of non-zero $w_i$'s is limited by a maximum number. By limiting the number of non-zero $w_i$'s, the model complexity and response time during inference can be improved. It should be noted that, with the ensemble model according to aspects of the present disclosure, $w_i$ can be found without sharing raw data among clients. Further, per-sample results of each client are also not shared, as the per-sample results may reveal private information such as label distribution of the client's local data.

The optimal set of $w_i$'s can be found using an optimization procedure, where one objective is defined to minimize the error between the predicted label given by the ensemble model and the ground truth label, subject to a constraint of the maximum number of models included in the ensemble. The optimal set of $w_i$'s can be directly recomputed with the goal is modified to only fit a subset of clients' data, without sharing models or recomputing the aggregated information again. Depending on the objective, the computation of the optimal set of $w_i$'s can possibly include one or more rounds of information exchange and local computation among clients, where the computation and communication overhead for such exchange is significantly smaller than a typical iterative federated learning approach.

If $f_i(x)$ denotes the output vector, such as output 138 of FIG. 6, after optional post-processing, of the i-th model, where i=1, 2, . . . N, when the input data is x. It should be noted that the model is pretrained and hence $f_i(x)$ is a given or known function.

For this example, it is assumed that the goal of the ensemble model with weights $w=[w_1, \ldots w_i, \ldots w_N]$ is to minimize the mean square loss of all data samples such that $$F(w) := \frac{1}{|\bigcup_j D_j|} \sum_{j=1}^{N} \sum_{k \in D_j} \left\| y_k \sum_{i=1}^{N} w_i f_i(x_k) \right\|^2$$

where $D_j$ is the local dataset of client j and $y_k$ is the expected output vector (label) of data sample k. For an arbitrary ensemble weight $w_0$, Taylor expansion gives $$F(w)=F(w_0)+\nabla F(w_0)^T(w-w_0)+(w-w_0)^T H(F(w_0))(w-w_0)$$

where H is the Hessian matrix.

It should be noted that the above Taylor expansion is exact since the objective function has no derivative with order higher than two. Hence, the value, gradient and Hessian can be used to evaluate F(w) for any w. Since derivative operations are linear, each client, j, can compute its own $F_j(w_0)$, $\nabla F_j(w_0)$ and $H(F_j(w_0))$, then the sum of each of these will be the corresponding quantity in each term of the Taylor expansion. In this example, the aggregated information that each client sends after evaluating all the models include $F_j(w_0)$, $\nabla F_j(w_0)$ and $H(F_j(w_0))$. The size of this information is $1+N+N^2$.

Each client can compute $f_i(x_k)$ for each i and k and save the results locally. Therefore, each model i only needs to be evaluated on the entire local dataset once. In this way, existing models do not need to be re-evaluated when a new client and/or model joins.

The constrained optimization problem is to minimize F(w), subject to a maximum number of non-zero weights. This may be solved using non-linear optimization toolboxes that support binary/integer constraints or may be approximated by adding a regularization term to encourage the sparsity of w, followed by a rounding procedure, i.e., set small $w_i$'s to zero). Using the latter approach, the problem can then be solved using a gradient descent procedure.

While the above example with the objective to minimize the mean square loss of all data samples results in an exact Taylor expansion, when the objective function is in a different form, the Taylor expansion may no longer be exact, but it can still be used as an approximation. In some aspects, one or more rounds of distributed gradient descent on the weights can be performed.

With the foregoing overview of the example system 100 for federated ensemble learning, it may be helpful now to consider a high-level discussion of an example process. To that end, FIG. 7 presents an illustrative process related to provide federated ensemble learning from decentralized data. Process 700 is illustrated as a collection of blocks, in a logical flowchart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform functions or implement abstract data types. In each process, the order in which the operations are described is not intended to be construed as a limitation, and any number of the described blocks can be combined in any order and/or performed in parallel to implement the process. For discussion purposes, the process 700 is described with reference to the system 100 of FIGS. 1 and 2.

Referring to FIG. 7, a method 170 for providing an ensemble model in a federated ensemble learning environment is illustrated consistent with an exemplary embodiment. The method 170 can include an act 172 where each client, having one or more models trained on its local dataset, exchanges models with the other clients. At act 174, each client evaluates each model on its local dataset and sends the results to a server. At act 176, the server selects an optimal subset of models and provides weights for each of the models in the optimal subset of models.

At act 180, if a new client joins the ensemble model, the new client receives the models of the other clients and evaluates these models on its local dataset. At act 182, the new client sends its model to the other clients and the other clients evaluate this new model on its local datasets. At act 184, the new client evaluates the models on its local dataset, and act 176 is repeated to cause the server to select an optimal subset of models and provide weights for each of the models in the optimal subset of models.

At act 190, if a model and/or a client leaves the ensemble model, information about the model and/or client is removed or ignored. With the removed or ignored model and/or client, the process 700 can repeat act 176 to cause the server to select an optimal subset of models and provide weights for each of the models in the optimal subset of models.

At act 200, if a client changes its model, the updated model is sent to the other clients. At act 202, the updated model is evaluated on each of the client's datasets. Act 176 is repeated to cause the server to select an optimal subset of models and provide weights for each of the models in the optimal subset of models.

At act 210, if a client changes its dataset, the client evaluates each of the models, including its own model and the models of the other clients, on the updated dataset. Act 176 is repeated to cause the server to select an optimal subset of models and provide weights for each of the models in the optimal subset of models.

Figure 8:
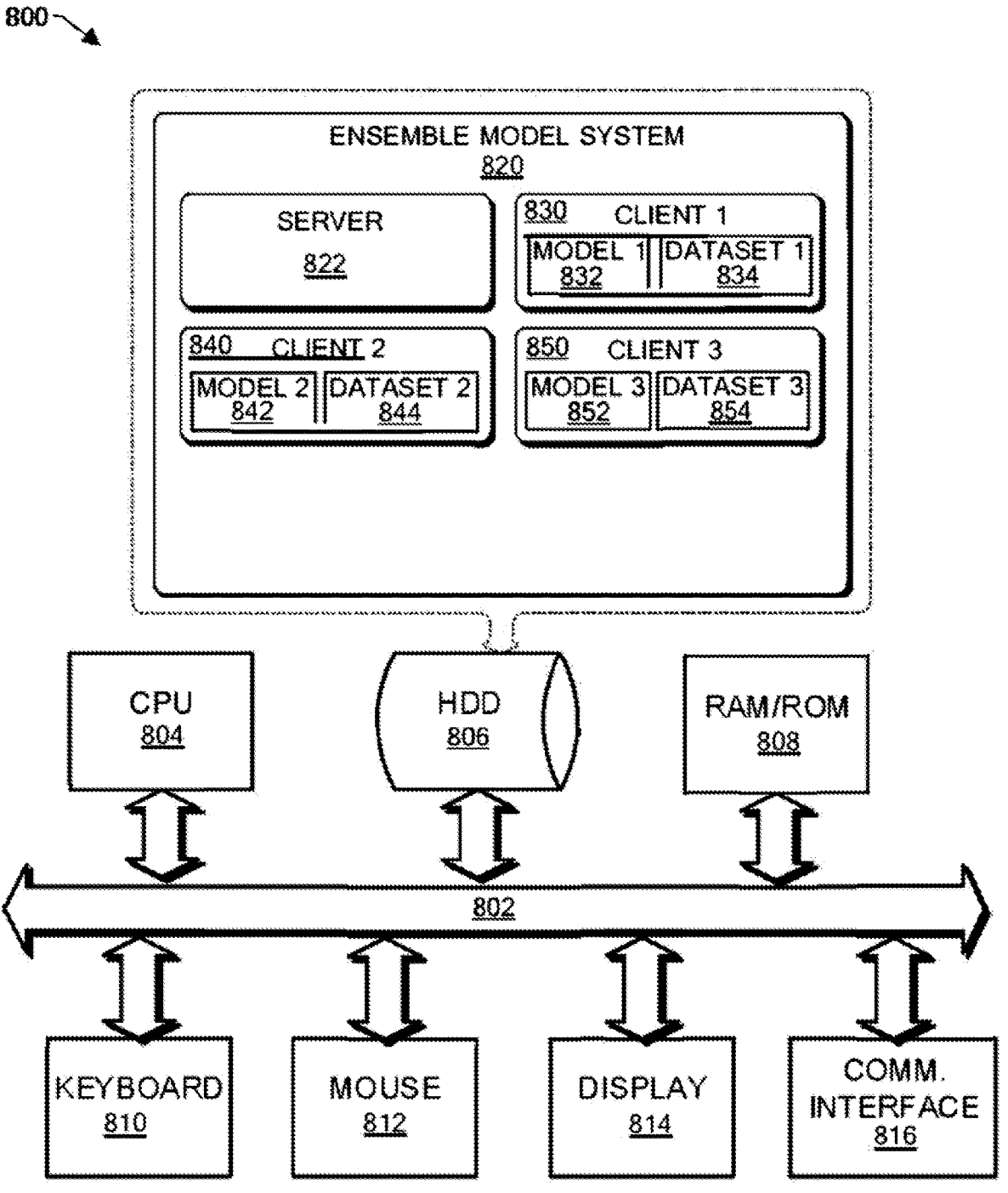
FIG. 8 is a functional block diagram illustration of a computer hardware platform that can be used to implement a particularly configured computing device that can host a system for training models for federated ensemble learning, consistent with an illustrative embodiment.

FIG. 8 provides a functional block diagram illustration of a computer hardware platform 800 that can be used to implement a particularly configured computing device that can host an ensemble model system 820. The ensemble model system 820 can provide federated ensemble learning, as discussed in detail above. The ensemble model system 820 can include a server 822 and a plurality of clients, such as client 830, client 840 and client 850. Each client 830, 840, 850 can locally host a respective model 832, 842, 852 and a respective dataset 834, 844, 854. In particular, FIG. 8 illustrates a network or host computer platform 800, as may be used to implement an appropriately configured ensemble model system 820.

The computer platform 800 may include a central processing unit (CPU) 804, a hard disk drive (HDD) 806, random access memory (RAM) and/or read only memory (ROM) 808, a keyboard 810, a mouse 812, a display 814, and a communication interface 816, which are connected to a system bus 802.

In one embodiment, the HDD 806, has capabilities that include storing a program that can execute various processes, such as the ensemble model system 820, in a manner described herein.

While the above description described a federated learning system with multiple clients and a server, other arrangements are contemplated within the scope of the present disclosure. For example, aspects of the present disclosure can be drawn to a federated learning system with multiple clients connected in a peer-to-peer manner, where each client can act as the server simultaneously. The information of each client can be shared with all other clients in this case. In other aspects, a non-federated system with a single machine, such as a server, can be used. In this arrangement, the same update rules discussed above can be applied for dynamically combining different models in the ensemble and determining the weights of the combination, based on the application scenario of interest, where the scenario can be described by metadata of each data sub-set corresponding to the local datasets of clients in the federated setting described above.

CONCLUSION

The descriptions of the various embodiments of the present teachings have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to a flowchart illustration and/or block diagram of a method, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of an appropriately configured computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The call-flow, flowchart, and block diagrams in the figures herein illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A computer implemented method comprising:

distributing a plurality of prediction models in a federated ensemble learning environment, where each of a plurality of clients initially includes at least one associated prediction model from the plurality of prediction models, among all of the plurality of clients to provide each of the plurality of clients with each of the plurality of prediction models;

evaluating each of the plurality of prediction models on at least a portion of a local dataset resident on each of the plurality of clients to output a quantification indicating how each of the plurality of prediction models fits at least the portion of the local dataset of each of the plurality of clients; and generating an ensemble model by a central server by applying weights to each of the plurality of prediction models based on evaluation results computed by each client locally, the evaluation results including a value, a gradient, and a Hessian matrix of a user-defined objective, wherein the ensemble model is generated in a decentralized manner without including an exchange of raw data among the plurality of clients.

2. The computer implemented method of claim 1, wherein a vector is independent of a size of the local dataset resident on each of the plurality of clients.

3. The computer implemented method of claim 1, further comprising performing one or more rounds of distributed gradient descent on the weights.

4. The computer implemented method of claim 1, further comprising limiting a number of models from the plurality of prediction models that are assigned a weight greater than zero to a predetermined threshold.

5. The computer implemented method of claim 1, further comprising excluding a number of clients, and additional associated prediction models resident on respective ones of the number of clients, from the plurality of clients.

6. The computer implemented method of claim 1, further comprising:

adding an additional client to the plurality of clients;

distributing each of the plurality of prediction models to the additional client; and distributing one or more additional models associated with the additional client to the plurality of clients such that the one or more additional models is evaluated on the local dataset resident on each of the plurality of clients, and each of the plurality of prediction models, including the one or more additional models, are evaluated on the additional client.

7. The computer implemented method of claim 1, further comprising, removing or ignoring the associated prediction model of a removed client from each of the plurality of clients.

8. The computer implemented method of claim 1, further comprising, upon determining that a model has changed on one of the plurality of clients, re-valuating the changed model on each of the plurality of clients on at least the portion of the local dataset resident on each of the plurality of clients.

9. The computer implemented method of claim 1, further comprising, upon determining that at least the portion of the local dataset of a changed client of the plurality of clients is changed, re-evaluating each of the plurality of prediction models on at least the portion of the local dataset of the changed client.

10. The computer implemented method of claim 1, further comprising optimizing the weights applied to each of the plurality of prediction models to minimize error between a predicted label given by the ensemble model and a ground truth label.

11. The computer implemented method of claim 1, further comprising sending to the central server, each vector for each of the plurality of clients.

12. A computerized federated ensemble learning system comprising:

a plurality of clients in communication with a server;

a plurality of prediction models resident at each of the plurality of clients; and a local dataset resident at each of the plurality of clients, wherein:

each of the plurality of prediction models are distributed among each of the plurality of clients, each of the plurality of clients is configured to evaluate each of the plurality of prediction models on at least a portion of the local dataset resident on each of the plurality of clients and output a quantification indicating how each of the plurality of prediction models fits at least the portion of the local dataset of each of the plurality of clients, and the server is configured to receive a vector from each of the plurality of clients and generate an ensemble model by applying weights to each of the plurality of prediction models, wherein:

the ensemble model is generated in a decentralized manner without including an exchange of raw data among the plurality of clients, and the ensemble model is configured to allow incremental and/or decremental updates to one or more of the plurality of clients without a need to re-evaluate all of the plurality of prediction models.

13. The computerized federated ensemble learning system of claim 12, wherein the vector is independent of a size of the local dataset resident at each of the plurality of clients.

14. The computerized federated ensemble learning system of claim 12, wherein the server is configured to assign the weights such that a predetermined threshold number of models from the plurality of prediction models are assigned a weight greater than zero.

15. A non-transitory computer readable storage medium tangibly embodying a computer readable program code having computer readable instructions that, when executed, causes a computer device to carry out a method of improving computing efficiency of a computing device operating a federated learning system, the method comprising:

distributing a plurality of prediction models in a federated ensemble learning environment, where each of a plurality of clients initially includes at least one associated prediction model from the plurality of prediction models, among all of the plurality of clients to provide each of the plurality of clients with each of the plurality of prediction models;

evaluating each of the plurality of prediction models on at least a portion of a local dataset resident on each of the plurality of clients to output a quantification indicating how each of the plurality of prediction models fits at least the portion of the local dataset of each of the plurality of clients; and generating an ensemble model by a central server by applying weights to each of the plurality of prediction models based on evaluation results computed by each client locally, the evaluation results including a value, a gradient, and a Hessian matrix of a user-defined objective, wherein the ensemble model is generated in a decentralized manner without including an exchange of raw data among the plurality of clients.

16. The non-transitory computer readable storage medium of claim 15, wherein a vector is independent of a size of the local dataset resident on each of the plurality of clients.

17. The non-transitory computer readable storage medium of claim 15, wherein the execution of the computer readable program code further configures the computer device to perform operations comprising limiting a number of models from the plurality of prediction models that are assigned a weight greater than zero to a predetermined threshold.

18. The non-transitory computer readable storage medium of claim 15, wherein the execution of the computer readable program code further configures the computer device to perform operations comprising optimizing the weights applied to each of the plurality of prediction models to minimize error between a predicted label given by the ensemble model and a ground truth label.

* * * * *